Aug. 2, 1927. 1,637,866
C. B. LIGHTFOOT
DRIP PAN FOR FOOD CHOPPERS
Filed Nov. 10, 1926
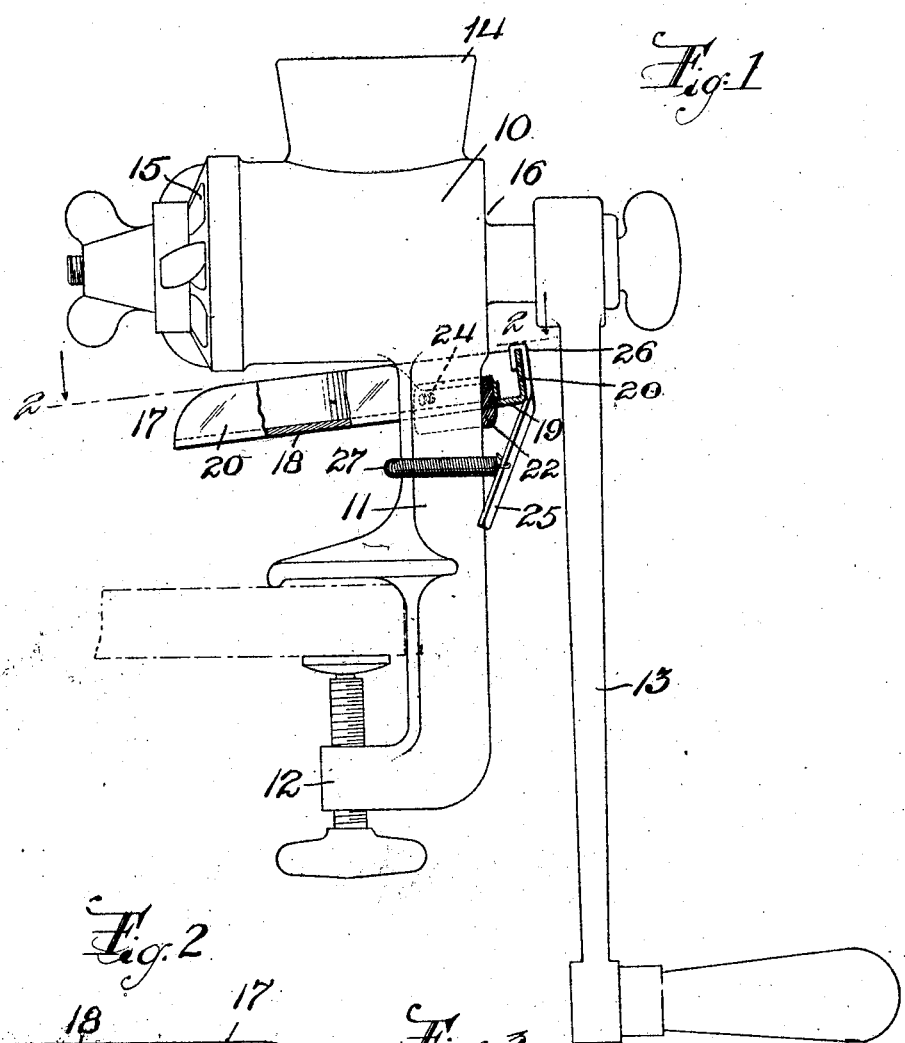
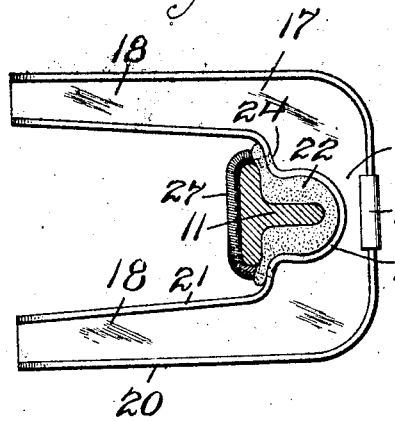
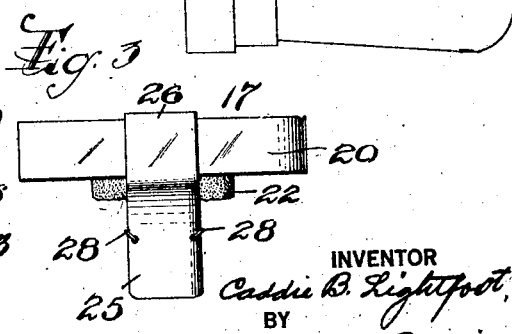
INVENTOR
Caddie B. Lightfoot,
BY
Wm H Canfield
ATTORNEY Patented Aug. 2, 1927.

1,637,866

UNITED STATES PATENT OFFICE.

CADDIE B. LIGHTFOOT, OF EAST ORANGE, NEW JERSEY.

DRIP PAN FOR FOOD CHOPPERS.

Application filed November 10, 1926. Serial No. 147,407.

This invention relates to a drip pan for the ordinary type of food chopper and is designed to catch the drip of liquid that often escapes through the end of the chopper next to the handle and to conduct the drip so received into the pan in which the chopped material is deposited from the main outlet of the chopper. This not only saves all the material but saves labor in that the juices from food do not drip on the floor or table.

The invention comprises a U-shaped trough that is secured so that it straddles the upright support of the chopper above the clamp and it can be readily attached and detached without the use of tools and can be easily cleaned when so detached.

The invention is illustrated in the accompanying drawings in which Figure 1 is a side view of a food chopper with the drip pan shown in section and partly broken away. Figure 2 is a section on line 2—2 in Figure 1 and Figure 3 is an end view of the drip pan detached. The drawing shows an ordinary commercial food chopper comprising the main casing 10 and a supporting leg 11 provided with the usual clamping end 12 by means of which the device is secured to a table, being operated by the handle 13 to chop material placed through the hopper 14 which material when chopped emerges through the outlet 15.

In operating these choppers when moist or juicy material is chopped, part of the liquid is let out through the end 16 adjacent to the handle, the fit here not being very tight as the end closer is removed with the handle and the conveyer part of the chopper when the chopper is cleaned. These parts are cast and in the absence of a close fit this drip is continued and the drip usually runs down the leg 11 to the floor and thus not only makes considerable work in cleaning it up but wastes, in many cases, valuable juices.

In order to catch this drip I arrange a U-shaped trough 17, substantially parallel arms 18 being connected by a cross piece 19, all of these parts having a marginal flange 20 on the outside and a flange 21 on the inside. When this device is in place the drip is conducted to the outlet end which is above the pan or dish which is arranged to receive the chopped material from the outlet 15.

In order to catch the drip that would run down on the metal part of the chopper I provide a tight fit around the outer side of the leg 11 by a rubber block 22 which is made of relatively soft rubber and is preferably held in place by insertion in the indented part 23 on the inner side of the cross piece 19 of the trough. If necessary, small rivets 24 can be inserted to hold the block in position. To give the trough the proper slope and to assist in holding it firmly in place, I arrange the inwardly and downwardly extended strip 25 which is usually of metal and is slightly bent at its lower portion to center it on the rib of the leg 11 and is secured to the top edge of the flange 20 by bending it over as at 26, which bending is usually tight enough to hold it in place but can be supplemented by soldering if necessary. To this strip 25 I secure the ends of a looped spring 27, the ends of the spring being formed in the hooks 28 which pass through holes in the edges of the strip 25. By unhooking one of the hooks 28, the pan can be removed from the chopper.

It will be evident that modifications can be made in the device without departing from the scope of the invention.

I claim:—

1. A drip pan for food choppers comprising a U-shaped trough to straddle the support of a chopper and means for securing the trough in place.

2. A drip pan for food choppers comprising a U-shaped trough, with an inclined strip extending inwardly and downwardly from the cross-piece of the trough and a looped spring with its ends secured to the strip.

3. A drip pan for food choppers comprising a U-shaped trough, with an inclined strip extending inwardly and downwardly from the cross-piece of the trough and a looped spring with its ends secured to the strip, the cross piece having an indented part on the inner side of the cross piece and a rubber block in said indentation.

In testimony whereof I affix my signature.

CADDIE B. LIGHTFOOT.